J. WINKELMEYER.
COIN CONTROLLED APPARATUS.
APPLICATION FILED JUNE 28, 1912.

1,172,920.

Patented Feb. 22, 1916.
6 SHEETS—SHEET 1.

WITNESSES:
J. H. Gardner
M. J. Messenheimer

INVENTOR:
John Winkelmeyer,
BY E. T. Silvius,
ATTORNEY.

J. WINKELMEYER.
COIN CONTROLLED APPARATUS.
APPLICATION FILED JUNE 28, 1912.

1,172,920.

Patented Feb. 22, 1916.
6 SHEETS—SHEET 4.

WITNESSES:
J. H. Gardner
M. J. Messenheimer

INVENTOR:
John Winkelmeyer,
BY
E. T. Silvius.
ATTORNEY.

J. WINKELMEYER.
COIN CONTROLLED APPARATUS.
APPLICATION FILED JUNE 28, 1912.

1,172,920.

Patented Feb. 22, 1916.
6 SHEETS—SHEET 6.

WITNESSES:
J. H. Gardner
M. J. Messenheimer

INVENTOR:
John Winkelmeyer,
BY E. T. Silvius,
ATTORNEY.

UNITED STATES PATENT OFFICE.

JOHN WINKELMEYER, OF GREENFIELD, INDIANA, ASSIGNOR TO SPECIALTY MANUFACTURING COMPANY, OF GREENFIELD, INDIANA, A CORPORATION OF INDIANA.

COIN-CONTROLLED APPARATUS.

1,172,920.  Specification of Letters Patent.  Patented Feb. 22, 1916.

Original application filed November 3, 1911, Serial No. 658,404. Divided and this application filed June 28, 1912. Serial No. 706,416.

*To all whom it may concern:*

Be it known that I, JOHN WINKELMEYER, a citizen of the United States, residing at Greenfield, in the county of Hancock and State of Indiana, have invented a new and useful Coin-Controlled Apparatus, of which the following is a specification, reference being had to the accompanying drawings and to the letters and figures of reference marked thereon.

The invention relates to mechanism for operating vending machines, more particularly such as are adapted for vending postage stamps or other articles of similar shape, the invention having reference more particularly to mechanism requiring the use of coins to effect the operation thereof, which mechanism was originally shown and described in my pending application for Letters Patent of the United States, filed November 3, 1911, Serial No. 658,404, of which this is a divisional application for Letters Patent.

An object of the invention is to provide improved coin-controlled apparatus for various purposes, more especially for use in connection with stamp-vending machines.

Another object of the invention is to provide coin-controlled apparatus for vending machines that shall be so constructed as to prevent fraudulent operation of the vending machine by means of slugs or imitations of coins of larger or smaller size than the required coins.

A still further object is to provide simple and inexpensive coin-controlled apparatus that shall be strong and reliable and not be liable to derangement in use.

The invention consists in improved coin-controlled apparatus comprising two series of mechanism normally disconnected each from the other and connectible only by the interposition of standard coins, the invention including mechanism for operating and controlling magazines for dispensing purchasable articles.

The invention consists further in the novel parts and in the combinations and arrangements of parts as hereinafter particularly described and also defined in the appended claims.

Referring to the drawings.

Throughout the drawings similar reference characters indicate corresponding elements or features of construction in the different figures thereof.

In order to clearly explain the invention it is shown in connection with the dispensing machine forming the subject-matter of said prior patent application.

The machine comprises a base 1 having a head 2 therein. An inclosing casing which constitutes a portion of the frame of the machine is provided and preferably comprises a bottom 3 that is seated upon the base and suitably secured thereto, a substantially cylindrical wall 4 extending upward from the bottom 3, two opposite side portions of the wall having suitable openings therein and lateral extensions 5 and 5' connected with the wall at the edges of the openings, the extensions being in the form of inverted arches. Two substantially cylindrical boxes 6 and 6' are formed integrally with the extensions and the lower portions of the extensions. An upper removable casing cover part comprises a substantially cylindrical shell 7 having a top 8 thereon, the shell being removably seated upon the wall 4 and it has openings in two opposite side portions thereof from which extend two arch-like casing portions constituting extensions 9 and 9' that are removably seated upon the extensions 5 and 5', the inverted arches and the arches thereon comprising cylindrical extensions for inclosing the principal operating mechanism of the machine. Two suitable frames 10 and 10' are removably mounted in the ends of the cylindrical extensions, and each frame has a transparent head 11 therein for closing the end of the extension. The wall 4 has a suitable aperture 12 therein and the shell or wall extension 7 has a similar aperture 13 therein through which the articles are delivered by the machine. A vertical shaft 14 is secured to the bottom 3 of the casing and it extends through the top of the casing and has a nut 15 thereon for holding the upper portion of the casing in normal position, and preferably the nut is inclosed by a suitably locked cap 16.

A frame plate 17 is provided with a hub 18 which is secured to the shaft 14 upon the bottom 3, the plate extending horizontally above the bottom, and it has two arms 19 and 20 on opposite portions thereof and two companion arms 19' and 20'. Two latch bars 21 and 22 are mounted between their ends on pivots 23 and 24 respectively with which the pairs of arms are provided, the inner ends of the latch bars being provided with springs 25 and 26 respectively for yieldingly forcing the outer ends of the latch bars upward. The arms 19 and 20 have curved guards 27 and 28 thereon respectively, the arms 19' and 20' have similar guards 27' and 28' thereon respectively, the guards being curved concentrically to the shaft 14, and the guards 27 and 28 have stop projections 29 and 29' thereon respectively.

A suitable annular rotary magazine 30 may suitably be composed of several principal parts secured together, the magazine being cylindrical and suitably provided with pockets or recesses in its periphery, the periphery portion being hollow so as to contain articles to be vended and it has a hub 31 rotatably mounted on the shaft 14 and upon the hub 18, the hub preferably being connected to the peripheral portion by means of spokes 32. The upper side of the peripheral portion has gear teeth 33 thereon, and the interior of the peripheral portion is suitably divided by means of ribs 34 and peripheral wall portions 35 so as to hold the stamps or other articles separately. One wall portion 36 is broader than the others so as to constitute a blanking space where a stamp can not be inserted into the periphery of the magazine. The lower inner side of the magazine is provided with projections 37 that are similar to saw-teeth in shape.

Another frame member comprises a hub 38 and two arms 39 and 39' on opposite sides thereof, the hub being suitably secured to the shaft 14 on the top of the hub 31, and the two arms have stub shafts 40 and 40' thereon respectively that extend horizontally into the cylindrical extensions of the casing and are provided on their ends with heads 41 and 41' respectively. Two pinions 42 and 42' are rotatably mounted on the two stub shafts respectively and have disks 43 and 43' thereon respectively, the periphery of the disks having notches 44 and 44' therein to receive the end portions of the latch bars 21 and 22 respectively for locking the pinions, the pinion 42 being in connection with the gear teeth 33. The disks are on the outer end portions of the pinions and the outer side of each disk has two concentrically arranged guide ribs 45 and 46 thereon and transversely arranged stop bars 47 and 48 at opposite ends of the ribs, and curved slots 49 and 49' are formed in the two disks respectively between the ribs of the stop bars. The two disks, which constitute parts of the operating gearing, are arranged at opposite peripheral portions of the magazine contiguously above the outer ends of the latch bars. Two disk-like wheels 50 and 50' are rotatably mounted on the two stub shafts 40 and 40' adjacent to the outer sides of the two disks respectively, and the inner side of the wheels have tangentially arranged cams 51 and 51' thereon from which extend guide ribs 52 and 52' respectively that are concentric to the axes of the wheels, for retracting the latch bars 21 and 22 from the notches and temporarily holding them in retracted position while the pinions are rotated. The wheels have also respectively two projections 53 and 53' on the inner side thereof that project into the slots 49 and 49′ respectively, a spring 54 being seated against the projection 53 and one of the stop bars 48, another spring 54′ being seated against the projection 53′ and the stop bar 48 on the other disk, the springs being guided by the concentric ribs 45 and 46 to form elastically yielding driving connections between the wheels and the disks, the springs acting to hold the projections at one end of the slots and permitting the wheels 50 and 50′ to be slightly rotated for withdrawing the latch bars before rotating the disks 43 and 43′. The outer side of the wheels 50 and 50′ are provided with a suitable number of lateral projecting lugs 55 and 55′ respectively, which are spaced apart on each wheel at proper distances to receive a five-cent nickel coin between each two lugs, so that an inserted coin shall serve to assist in rotating the wheel. Each lug is approximately pear-shaped in cross section and arranged so that the narrower portion extends outwardly approximately toward the periphery of the wheel.

The operating mechanism includes also two rockers comprising hubs 56 and 56′ rotatably mounted on the two stub shafts 40 and 40′ respectively adjacent to the fronts or outer sides of the wheels 50 and 50′, the hubs having webs 57 and 57′ thereon respectively that are substantially disk-like and have rims 58 and 58′ thereon respectively that extend beyond the two sides of the webs and have operating arms 59 and 59′ thereon respectively, the inner edges of the rims being provided with projecting stop fingers 60 and 60′ respectively which in operation are moved into contact with and normally rest upon the stop projections 29 and 29′ respectively. The webs have outwardly bulged portions or corrugations 61 and 61′ that extend concentrically about the axes of the rockers and have apertures 62 and 62′ in the normally lower portion of the outer walls thereof, somewhat distant portions of the webs having apertures 63 and 63′ therein that extend partially in the disk-like portions and also in the bulged portions of the web. The disk-like portions of the web at the inner ends of the apertures have inclined guides 64 and 64′ thereon respectively adapted to guide an imitation coin or slug from the inner side to the outer side of the web through the aperture. The front plates of the bulged portions have slots 65 and 65′ therein respectively through which the operating coins may be seen. The inner sides of the webs 57 and 57′ have continuous annular guide ribs 66 and 66′ thereon respectively that are concentric to the hubs of the rockers and extend substantially to the wheels 50 and 50′ for stopping the coins when inserted between the lugs on the wheels. The normally upper portions of the rims 58 and 58′ have coin-slots 67 and 67′ therein, and the normally lower portions of the rims have similar slots 68 and 68′ therein, the slots extending circumferentially at the inner sides of the planes of the webs 57 and 57′ respectively. The inner sides of the webs have also guide ribs 69 and 69′ thereon respectively that extend concentrically to the axes of the rockers approximately from one to the other coin slot at a suitable distance outward beyond the ribs 66 and 66′ to receive standard coins between the two ribs.

Figures 16, 17, 18, 19, 20, 21:
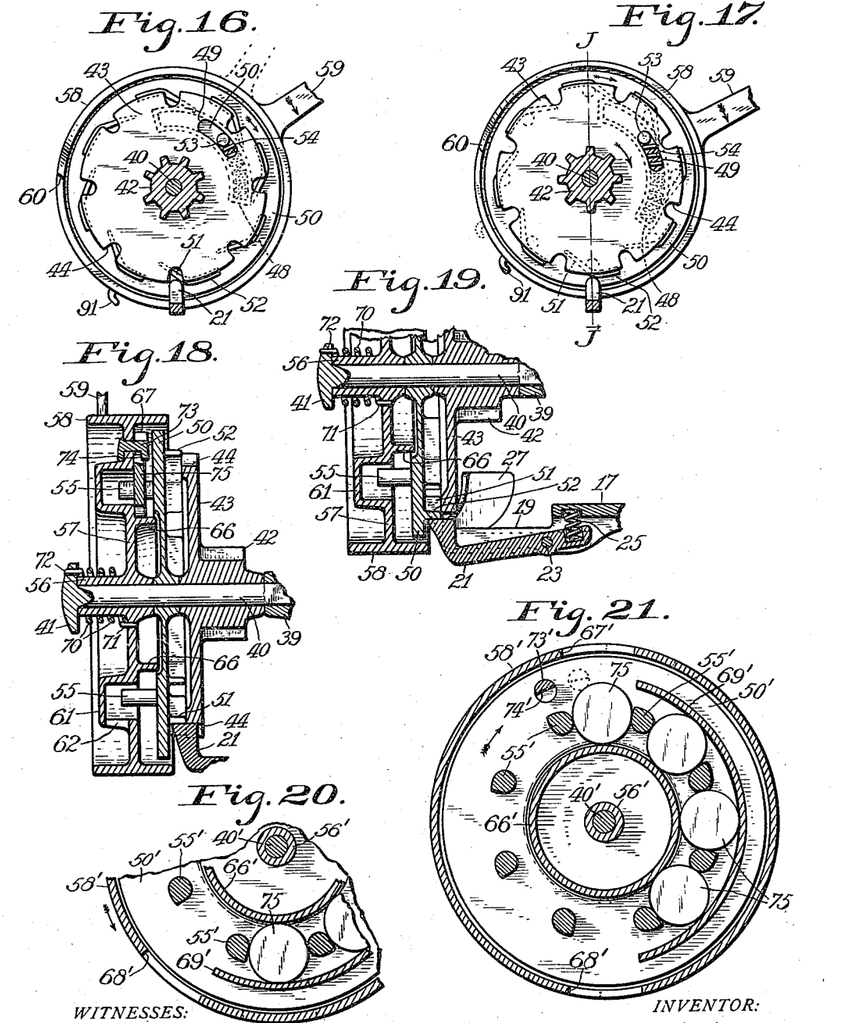
Fig. 16, a section approximately on the line G G illustrating parts in the position assumed while in operation.
Fig. 17, a section also approximately on the line G G with the parts in different position in operation.
Fig. 18, a fragmentary section on the plane of the line I I in Fig. 15.
Fig. 19, a fragmentary section on the plane of the line J J in Fig. 17.
Fig. 20, a fragmentary section on the line K K in Fig. 3.
Fig. 21, a fragmentary section also on the line K K with the parts in different position in operation.
Figure 22:
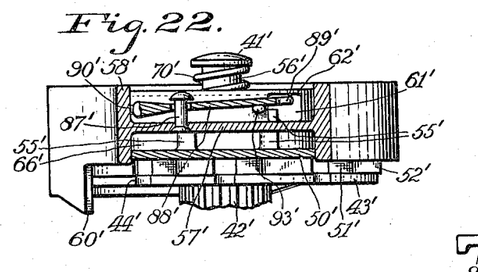
Fig. 22, a fragmentary section on the plane of the line L L in Fig. 10.
Figure 23:
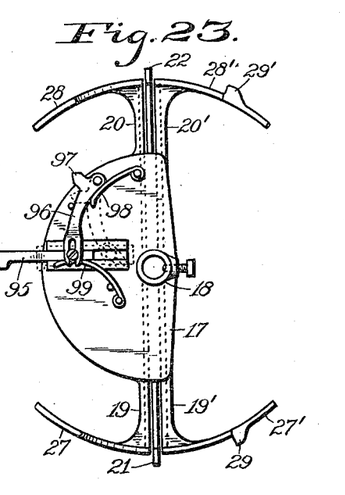
Fig. 23, a plan of the mechanism for ejecting the articles from one of the magazines.
Figure 24:
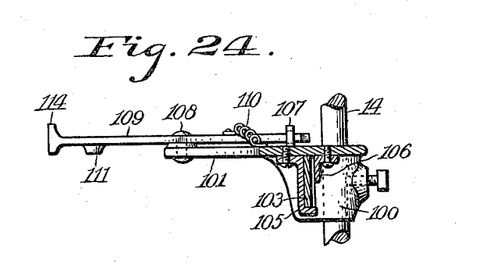
Fig. 24, a fragmentary sectional elevation of the preferred mechanism for rejecting stamps from the magazine and parts of interlocking devices.
Figure 25:
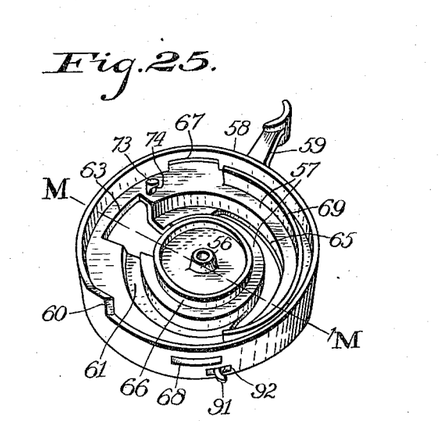
Fig. 25, a perspective view of one of the operating devices, and Fig. 26, a section on the plane of the line M M in Fig. 25.
Figure 26:
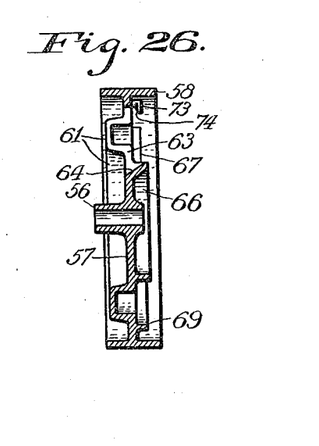

Two coil springs 70 and 70′ are placed on the hubs 56 and 56′ respectively and have end lugs 71 and 71′ that are secured to the webs or hubs of the rockers, the springs having also end lugs 72 and 72′ that are secured to the heads 41 and 41′ respectively, the springs being adapted to retract the rockers in operation. The two webs 57 and 57′ have lugs 73 and 73′ on the inner or rear sides thereof respectively and arranged in planes adjacently to the apertures 63 and 63′ respectively, and the inner sides of the lugs have recesses 74 and 74′ therein respectively, each recess being adapted to receive the edge portion of a coin or slug that is less in thickness than the standard coin but can not receive the standard coin 75, the lug being so arranged as to engage the periphery of an inserted coin as indicated in dotted lines in Fig. 21 when the rocker is retracted, or to pass over a relatively thinner lug. The upper portions of the cylindrical extensions of the casing have coin chutes 76 and 76′ therein respectively for guiding the coins into the slots 67 and 67′ respectively, the upper external portions of the casing extensions preferably being provided with slotted gage plates 77 and 77′ registering with the two coin chutes respectively, for preventing the insertion of slugs larger than the standard coin into the coin chutes. The casing extensions have also slots 78 and 78′ therein through which the operating arms 59 and 59′ extend.

The coin boxes 6 and 6′ are provided with cup-shaped bottoms 79 and 79′ respectively that are suitably connected to the boxes and they preferably have recesses 80 and 80′ in one portion thereof that normally are partially behind apertured ears 81 and 81′ that project from the boxes and receive shackles 82 and 82′ of padlocks 83 and 83′. The upper portions of the bottoms are provided with removable hopper plates 84 and 84′ having apertures 85 and 85′ therein respectively through which coins may fall from the slots 68 and 68′. The casing extensions preferably have sign plates 86 and 86′ thereon respectively for indicating the quantity of articles vended for five cents or a coin of other value placed in the respective coin chutes.

The webs 57 and 57′ of the rockers are provided on the outer side thereof with pivots 87 and 87' respectively that are arranged adjacent to the rims 58 and 58' and in proximity to the slots 62 and 62', and two dogs 88 and 88' are mounted on the two pivots respectively, the dogs being supported between their ends and provided at one end with ratchet teeth 89 and 89' respectively that extend through the slots so as to engage the lugs 55 and 55' respectively or to be retracted by the lugs, springs 90 and 90' being mounted on the rockers respectively and engaging the opposite ends of the dogs for holding them in normal position, the dogs having fingers 91 and 91' thereon that extend through suitable slots 92 and 92' respectively in the rims 58 and 58', so that the dogs may be retracted by hand and also be moved longitudinally of the pivot to either side of projections 93 and 93' formed on the adjacent wall of the bulged portion 61 of the web. When a dog is moved outwardly the lug 55 or 55' may be moved past the tooth of the dog without having contact therewith, and ordinarily the dogs are not accessible to be shifted by hand. It will be observed that the lug 55 or 55' extends a short distance only into the bulged portion of the web of the rocker so that there is clearance space beyond the end of the lug for the tooth 89 or 89' within the recess of the bulged portion, and it should be understood that if desired the dog may be held in retracted position by placing it in contact with the end of the projection 93.

Another magazine 30' constructed substantially as above described, excepting that the teeth 37 are omitted, is arranged in relatively inverted position in the upper portion of the casing, and the magazine therefore comprises an annular hollow portion provided with a hub 31' and connecting spokes 32', the under side of the peripheral portion of the magazine having downwardly extending gear teeth 33' thereon that are in mesh with the uppermost portion of the pinion 42', the hub 31' being supported upon the hub 38. The magazine is divided by means of radially extending partitional ribs 34' and peripheral wall portions 35', one wall portion 36' being broader than the others to form a blank space into which no stamps can be inserted.

The magazines, as will be seen, are adapted to receive a suitable number of stamps 94 or 94' or similar articles placed on edge between the partitional ribs, the stamp being inserted through the slots formed in the periphery.

In order to eject the stamps or other articles from the lower magazine the frame plate 17 is provided with a movable push bar 95 on its upper side that is engaged by a slotted arm 96 that is pivoted upon the plate and has a V-shaped finger 97 that is adapted to enter between two of the teeth 37, the finger being forced into contact with the teeth by means of a spring 98 and preferably is slightly retarded in movement by a brake spring 99. Preferably the articles are ejected from the upper magazine by somewhat different means comprising a hub 100 secured to the shaft 14 at the top of the hub 31' and a horizontal frame plate 101 on the hub, the plate having a suitably arranged slot 102 therein. A push bar 103 has a projecting finger 104 thereon and is slidingly mounted in suitable guides 105 and 106 supported by the plate, the push bar having an apertured ear 107 thereon that extends through the slot 102, the end of the finger being opposite the aperture 13 in the casing. The plate 101 is provided with a pivot 108 on which a lever 109 is pivoted between its ends, one end portion of the lever extending into the ear 107 for operating the push bar. A spring 110 is connected to the plate 101 and also to the lever 109 and strained so as to force the push bar outward toward the casing. The under side of the opposite end portion of the lever has a projection 111 thereon and the end of the lever normally extends into a recess 112 formed in the edge of the rim 58' that is adjacent to the upper magazine, the upper side of the magazine 30' having a projection 113 thereon which at the end of each complete revolution of the upper magazine is moved into contact with the projection 111 and is moved past the projection on the arm when the outer end of the arm is farther moved in the direction in which the magazine is moving. Preferably the outer end of the lever 109 has a vertical wristpin 114 thereon so as to avoid the necessity of making the rim undesirably thick where the recess 112 is formed therein. The lever 109 at normal rest position holds the finger 104 in retracted position and projects the finger toward the aperture 13 when the operating arm 59' is retracted to normal rest position, the lever withdrawing the finger when the operating arm is moved to rotate the magazine.

In order to charge the magazine without the use of coins for forming the required connections for rotating the magazine to bring the pockets therein successively to the apertures in the casing through which the stamps or articles must be inserted, the dogs 88 and 88' are placed behind the projections 93 and 93' so that the teeth of the dogs may act as ratchet pawls in connection with the lugs 55 and 55' respectively and ratchet the wheels 50 and 50' with each operation of the arms 59 and 59' respectively. Access may be had to the dogs when the bottoms of the coin boxes are swung aside or removed from the boxes. The operating arms 59 and 59' are moved and retracted repeatedly so that the magazines are rotated to bring the pockets therein in succession to the apertures 12 and 13. When all the pockets in the magazines are supplied with the articles to be vended excepting the blank portion in each magazine, the magazines are left in such position that the broader divisional portions 36 and 36' are opposite to and practically close the apertures in the casing, so that the articles can not be extracted without having been paid for as designed, it being understood that the attendant immediately shifts the dogs 88 and 88' to inoperative position after charging the magazine.

In practical use, in order to receive an article from the lower magazine, a coin is dropped into the coin chute 76, the coin passing at one side of the projection 73 onto the guide rib 66 between two of the lugs 55. The operating arm 59 is moved by hand in the direction indicated by the arrow, and the consequent movement of the rocker carries the projection 73 against the coin and forces the coin against the farther lug 55 so as to impart rotary movement to the wheel 50 having the cams 51 thereon, one of the cams being in contact with the latch bar 21 and moves it out of connection with the disk 43, the projection 53 at the same time being moved to the opposite end of the slot 49 and then imparts rotary movement to the disk, and consequently turns the pinion 42 which moves the lower magazine sufficiently to be again locked to permit the push bar 95 to push the stamp or stamps first appearing out of the aperture 12 to be completely removed by the purchaser.

Figure 1:
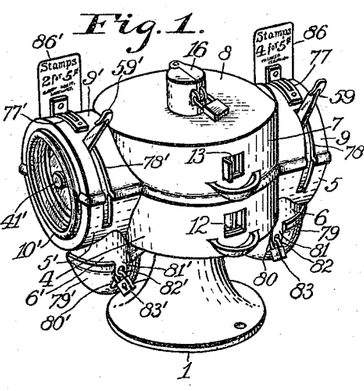
Figure 1 is a perspective view of a vending machine provided with the improved coin-controlled apparatus.
Figure 2:
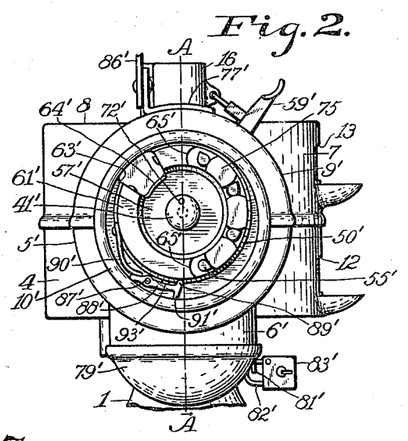
Fig. 2, an end elevation of the machine partially broken away.
Figure 3:
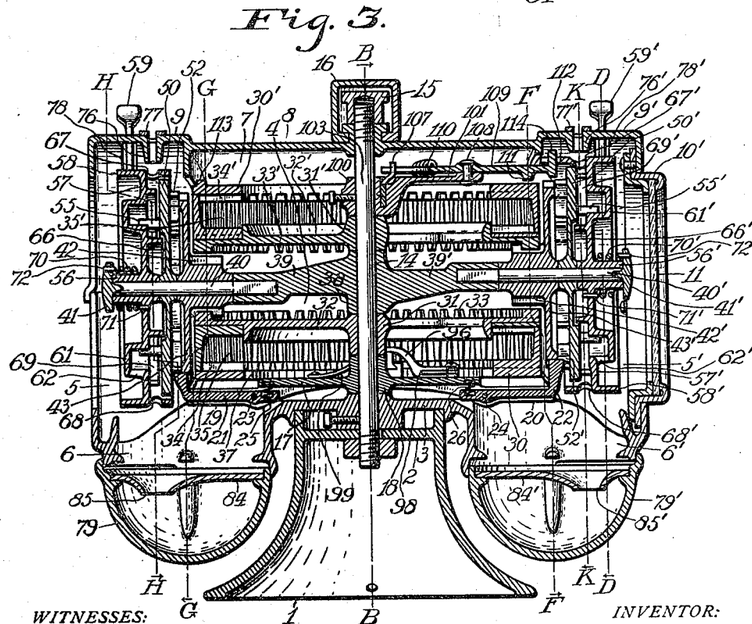
Fig. 3, a central section on the plane of the line A A in Fig. 2.
Figures 4, 5, 6, 7:
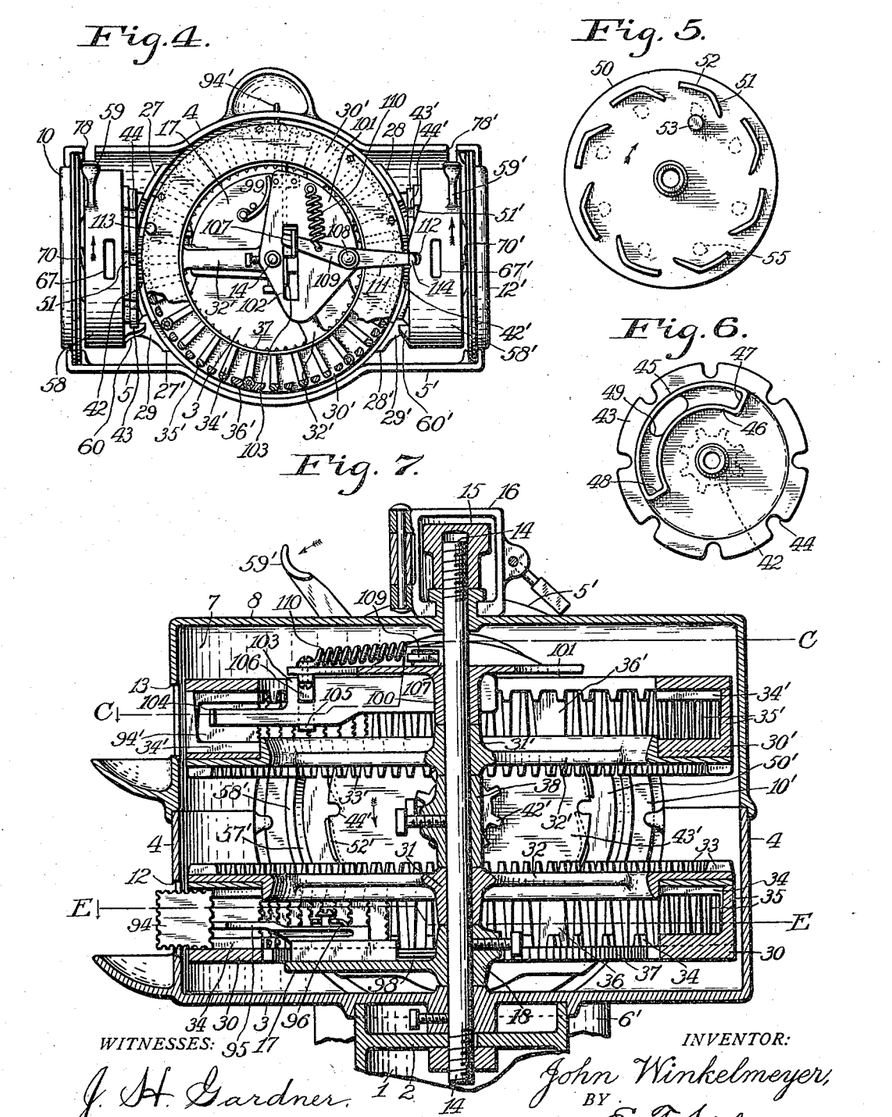
Fig. 4, a top plan of the machine with the upper portion of the casing thereof removed and portions broken away.
Fig. 5, a rear elevation of one of the operating devices.
Fig. 6, a front elevation of another one of the operating devices.
Fig. 7, a vertical section on the plane of the line B B in Fig. 3.
Figures 8, 9, 10, 11:
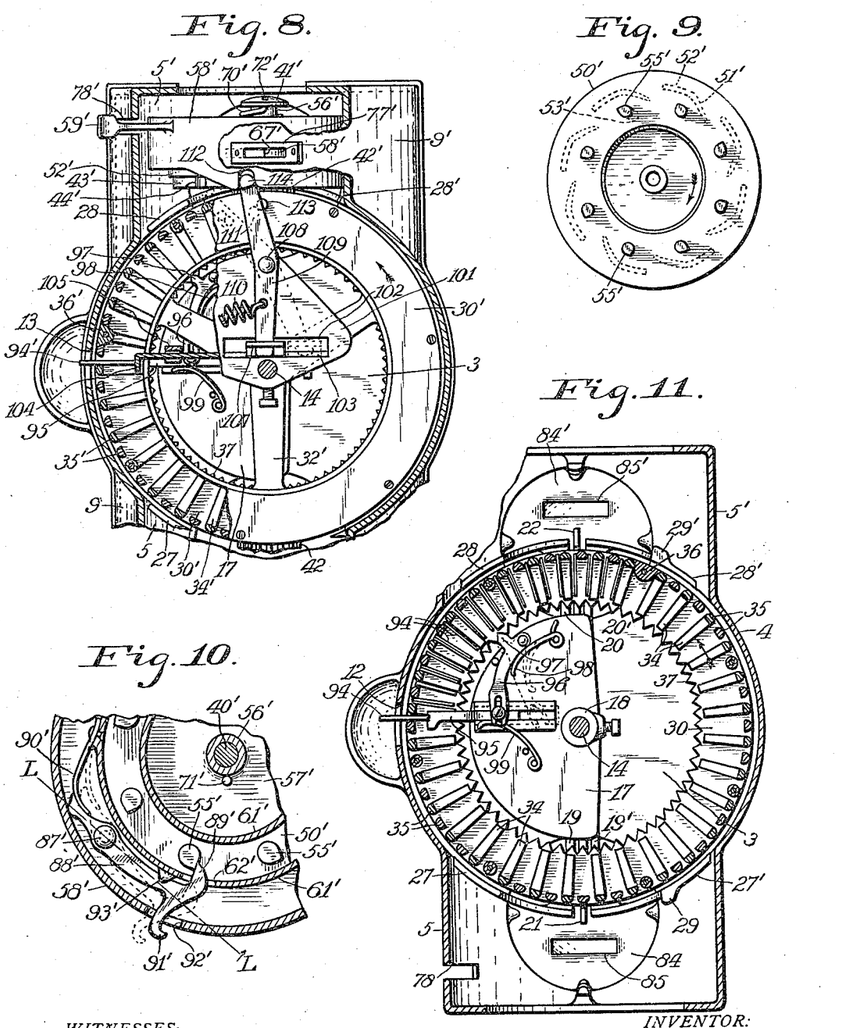
Fig. 8, a top plan of the machine partially broken away and in section approximately on the plane of the line C C in Fig. 7.
Fig. 9, a front elevation of the operating device shown in Fig. 5.
Fig. 10, a fragmentary section on the plane of the line D D in Fig. 3.
Fig. 11, a horizontal section partially broken away approximately on the plane of the line E E in Fig. 7.
Figure 12:
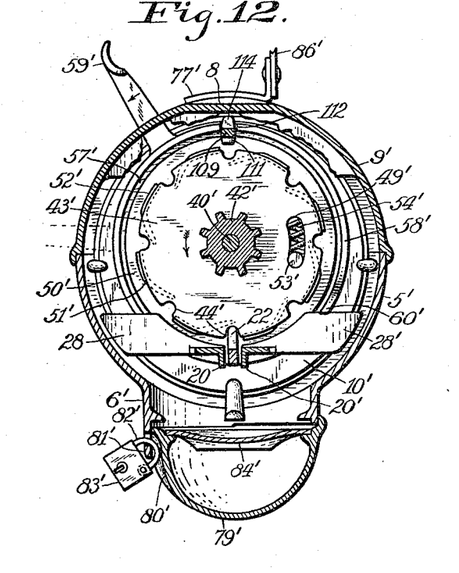
Fig. 12, a vertical section on the plane of the line F F in Fig. 3.
Figure 13:
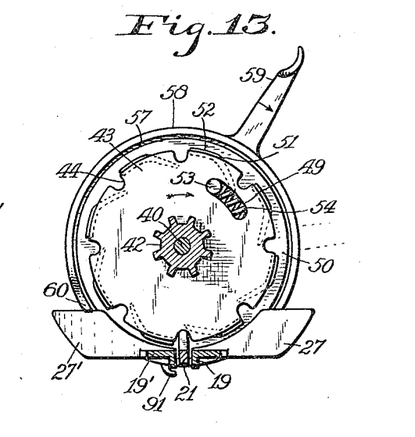
Fig. 13, a section on the plane of the line G G in Fig. 3.
Figure 14:
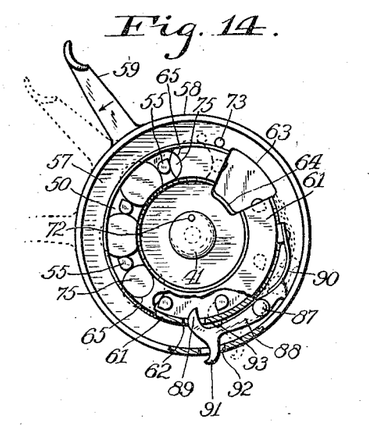
Fig. 14, a front elevation of one of the operating devices partially broken away.
Figure 15:
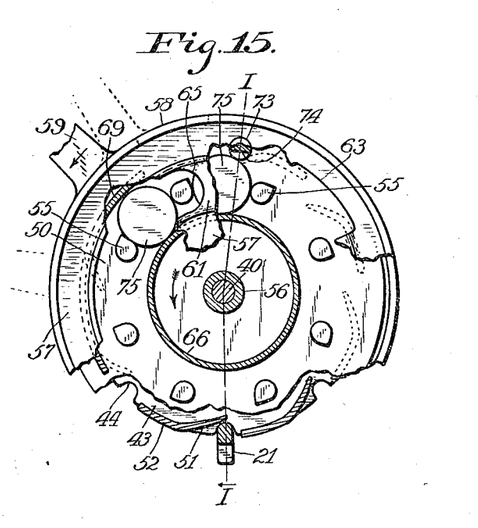
Fig. 15, a fragmentary section on the plane of the line H H in Fig. 3.

The upper magazine is operated in substantially the same manner as above described, it being necessary to place the coin in the chute 76' and manipulate the operating arm 59'. By reference to Fig. 4, it will be seen that the position of the lever 109 is such that the push bar 103 is projected to its normal rest position, the slot 67' being fairly in the uppermost portion of the rim 58' so that the coin may be received therein from the coin chute in the casing. By reference to Fig. 8, it will be seen that the lever 109 is in intermediate position and therefore holds the push bar in intermediate position but sufficiently far advanced to push the stamp 94' partially through the aperture 13 so that it may be withdrawn, this occurring only with the discharge of the last stamp in the magazine, it being assumed that the machine has been operated in the usual manner and that while the arm 59' has been pulled over so as to rotate the magazine and bring the last stamp in proper position to be discharged, the projection 113' having been moved to the position shown, and that the arm 59' has been retracted so that the outer end of the lever 109 is carried by the rim 58' to the position shown with the projection 111 against the projection 113, which prevents the lever from being retracted fully to its normal position, and consequently prevents the complete retraction of the rocker, and therefore the slot 67' is not brought fairly below the slot in the gage plate 77', so that a coin cannot be inserted into the adjacent coin chute, thus preventing the insertion of a coin after the magazine is empty.

In case it is attempted to fraudulently obtain an article from the machine by placing a slug that is less in thickness than the required coin into one of the coin chutes, the slug will fall to the position in which the coin should rest, and when the lug 73 is brought to the slug the upper edge of the slug is received into the recess 74 and the lug passes over and fails to move the slug, and at the same time the aperture 63 permits the slug to fall through the web to the forward side of the web, the inclined guide 64 having been brought under the slug which slides over and falls down into the coin box.

After a sufficient number of coins have been inserted and the machine repeatedly operated to bring the coins down past the lower end of the guide rib 69 or 69', the coins in succession fall through the slot 68 or 68' into the adjacent coin box.

Having thus described the invention, what is claimed as new is:—

1. Coin-controlled apparatus including a horizontal shaft, a rocker mounted to rock to and fro on the shaft and comprising a web and a cylindrical rim fixed on the web and having two slots in the upper and lower portions thereof respectively, the web having two guides thereon for guiding coins from the upper to the lower one of the slots and having also a lug thereon adjacent to the upper one of the slots, and a wheel rotatable on the shaft and having projections thereon in a circle between the two guides.

2. Coin-controlled apparatus including a horizontal shaft, a rocker mounted to rock to and fro on the shaft and comprising a web having a recess in one side thereof that extends concentrically to the shaft, the web having also two concentrical guides thereon on opposite sides respectively of the recess and a lug on the normal upper portion above the recess, and a wheel rotatable on the shaft opposite to the recessed side of the web and having projections thereon extending on a circle between the two guides and into the recess.

3. Coin-controlled apparatus including a fixed horizontal shaft having a fixed head, a rocker comprising a web having a projecting hub mounted rotatably on the shaft in contact with the head, the web having two concentrical guides thereon, the outer one of the guides extending from the normal upper to the lower portion of the web, the web having also a lug thereon spaced apart from the upper portion of the outer one of the guides, a wheel rotatable on the shaft and having projections thereon in a circle between the two guides, and a spring extending about the hub of the web and connected to the web and also to the head of the shaft.

4. Coin-controlled apparatus including a fixedly supported horizontal shaft, a wheel and a rocker adjacently arranged and independently rotatable on the shaft, the wheel having projections on one side thereof extending into the rocker and spaced apart to receive coins between them, the rocker having a recess receiving the ends of the projections and being provided with a lug on the upper portion thereof adapted to engage and force the coins in succession against the projections to turn the wheel, the rocker having a radially projecting operating arm, stops for limiting the movement of the rocker, and a spring anchored to and extending about the shaft and engaging the rocker for retracting the rocker to carry the lug away from the coins.

5. A machine including rotatably supported gearing, a movably supported lock coöperating with the gearing for preventing rotation of the gearing, a rocker supported adjacent to a rotatable element of the gearing and rotatable independently of the rotatable element, means carried by the rotatable element and the rocker enabling a coin to make operative connection of the rocker with the element, means carried by the gearing engaging and retracting the lock on movement of the rotatable element, stops for limiting the movement of the rocker, and a spring for retracting the rocker to one of the stops.

6. Coin-controlled apparatus including rotatably supported gearing, a rocker supported adjacent to a rotatable element of the gearing and rotatable on a horizontal axis to and fro independently of the element, the rocker being provided with movement-limiting stops and also having a lug on the upper portion thereof projecting toward the rotatable element and adapted for engaging a coin of predetermined thickness to move the coin with the rocker, the rocker having concentric guides thereon for the coin and also a receiving slot to guide the coin to the lug and the guides, and means carried by the rotatable element to be engaged by the coin for rotating the element.

7. Coin-controlled apparatus including a horizontally supported stub shaft, a wheel rotatable on the shaft and having projections adapted to receive coins between them on one side of the wheel, the projections being arranged in a circle concentric to the shaft, and a rocker rotatively mounted on the shaft adjacent to the wheel and comprising a web having two curved guides arranged concentrically to the shaft and extending substantially to the wheel on opposite sides respectively of the circle of the projections, the outer one of the guides extending only from the upper to the lower portion of the rocker, the web having an opening in the upper portion thereof and an inclined portion at the inner end of the opening extending laterally from the inner one of the guides, the web having also a lug thereon near one side of the opening and opposite the upper end of the outer one of the guides.

8. Coin-controlled apparatus including a shaft fixedly supported horizontally, a rocker mounted to rock to and fro on the shaft and provided with movement-limiting stops, the rocker having an operating arm extending therefrom, and having also two concentrically arranged curved guides fixed thereon, the inner one of the guides being continuous and concentric to the shaft, the outer one of the guides being a segment, the rocker having also a lug thereon opposite one end of the segmental guide, and a wheel rotatable on the shaft and having projections thereon arranged in a circle between the two guides.

9. Coin-controlled apparatus including a cylindrical casing having a coin-chute in its upper portion and also a slot in proximity to the coin-chute, a stub shaft fixedly supported horizontally in the casing, a wheel and a rocker rotatable independently on the shaft, the wheel having projections on one side thereof extending substantially to the rocker to receive coins between them from the coin-chute, the rocker being provided with a rim having a slot therein to receive the coins and having also an arm thereon that extends through the casing slot, the arm being limited in movement by the casing, a lug fixed on the upper portion of the rocker adapted to engage the coins in succession on movement of the rocker, and guides for temporarily retaining the coins between the projections.

10. Coin-controlled apparatus including a shaft horizontally supported, a disk rotatable on the shaft and having a driving pinion fixed on one side thereof, the disk having also a plurality of notches therein, a movably supported latch normally extending removably into one of the notches, a wheel rotatable on the shaft adjacent to the disk and having a plurality of projections thereon adapted to receive coins between them, the wheel having also cams for withdrawing the latch from the notches, a rocker rotatively mounted on the shaft adjacent to the wheel and having a lug thereon to engage the coins successively, guides for the coins fixed on the rocker, and yielding means elastically connecting the disk with the wheel and enabling the wheel after partial movement to move the disk following the action of the cam withdrawing the latch.

11. Coin-controlled apparatus including a frame comprising a casing, a disk rotatably mounted in the casing and having a pinion thereon for transmitting motion and having also a plurality of notches, a latch adapted to automatically enter the notches successively to lock the disk, coin-controlled operating means mounted in the casing and adapted for intermittently retracting the latch and rotating the disk, the operating means including a rocker adapted for engaging the coins successively and having an arm thereon that extends through and is limited in movement by the wall of the casing, and lock-out means coöperating with the frame and the operating means and adapted for preventing operative actuation of the operating means by means of the arm following a predetermined number of complete revolutions of the disk.

12. Coin-controlled apparatus including a frame comprising a casing, a stub shaft horizontally supported in the casing, a disk rotatably mounted on the shaft and having a pinion thereon for transmitting motion, coin-controlled operating means mounted on the stub shaft for intermittently rotating the disk, lock-out means coöperating with the operating means and the frame and adapted for preventing operative actuation of the operating means following a predetermined number of complete revolutions of the disk, and emergency means in the casing and connectible with the operating means and adapted for enabling the operating means independently of coin-control to rotate the disk.

13. A machine including a supported stub shaft, a wheel rotatable on the stub shaft and having projecting lugs adapted to receive coins between them on one side of the wheel, the lugs being arranged in a circle concentric to the stub shaft, and a rocker rotatively mounted on the stub shaft adjacent to the wheel and comprising a web and a rim, the rim having a slot therein, the web having an annular offset portion receiving the end portions of the lugs and having also an annular guide rib and a curved guide rib extending substantially to the wheel concentrically to the stub shaft, the annular rib being less in diameter than the circle of the lugs, the curved rib being a segment of a circle of greater diameter than the circle of the lugs, the web having an opening therein and an inclined portion at the inner end of the opening extending from the annular rib, the web having also a projection thereon near one side of the opening and opposite the annular rib and one end of the curved rib.

14. In a vending machine, the combination of a slotted casing, a stub shaft supported in the casing, a wheel rotatable on the stub shaft and having projections arranged in a circle on one side thereof and spaced apart to receive coins between them whereby to rotate the wheel, a disk having a pinion thereon and rotatably mounted in the casing, means coöperating with the wheel and the disk and adapted to enable the wheel to rotate the disk, and a rocker rotatably mounted on the stub shaft adjacent to the wheel and comprising a web and a cylindrical rim thereon extending substantially to the wheel, the rim having a slot therein normally in register with the slot in the casing, and having also an arm thereon extending through the casing wall, the web having an annular offset portion receiving the end portion of the projections, the rocker having a lug thereon extending toward the wheel and adapted to engage coins placed between the projections.

15. In coin-controlled apparatus, a rocker comprising an axial hub and a web thereon having a continuous annular guide on one side thereof extending concentrically about the hub, the web having also a curved segmental guide on said side extending partially about the continuous guide concentrically thereto, for guiding coins, the rocker being provided with a lug arranged at a distance from the continuous guide and opposite to one end of the segmental guide, the lug being spaced a greater distance from the end of the segmental guide and a lesser distance from the continuous guide relative to the distance between the two guides.

16. In coin-controlled apparatus, a rocker comprising an axial hub, a disk-like web on the hub, and a cylindrical rim on the web, the rim having two slots in two opposite portions thereof respectively adjacent to one side of the web, said side of the web having a continuous annular guide thereon extending concentrically about the hub and having also a curved segmental guide on one portion thereof extending partially about the continuous guide concentrically thereto, for guiding coins from one to the other of the two slots.

17. In coin-controlled apparatus, the combination of a supported shaft, a disk rotatably mounted on the shaft and having recesses in its periphery and also a slot extending circumferentially, the disk having also a stop bar thereon at a distance from one end of the slot, a latch bar movably supported and spring-pressed into contact with the periphery of the disk to enter the recesses, a wheel rotatably mounted on the shaft adjacent to the disk and adapted to engage and force the latch bar from the recesses on rotation of the wheel, the wheel having also a projection thereon extending movably into the slot, a spring interposed between said stop bar and said projection, a rocker rotatively mounted on the shaft adjacent to said wheel, and means enabling the rocker through a coin to rotate the wheel.

In testimony whereof, I affix my signature in presence of two witnesses.

JOHN WINKELMEYER.

Witnesses:
 WILLIAM C. WELBORN,
 GEO. A. CARR.

Copies of this patent may be obtained for five cents each, by addressing the "Commissioner of Patents, Washington, D. C."